United States Patent
Horie et al.

(10) Patent No.: US 11,822,471 B2
(45) Date of Patent: Nov. 21, 2023

(54) REDUCING WRITE BARRIERS IN SNAPSHOT-BASED GARBAGE COLLECTION

(71) Applicant: INTERNATIONAL BUSINESS MACHINES CORPORATION, Armonk, NY (US)

(72) Inventors: Michihiro Horie, Ageo (JP); Kazunori Ogata, Soka (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 17/544,292

(22) Filed: Dec. 7, 2021

(65) Prior Publication Data

US 2023/0176964 A1  Jun. 8, 2023

(51) Int. Cl.
*G06F 12/02* (2006.01)

(52) U.S. Cl.
CPC .. *G06F 12/0253* (2013.01); *G06F 2212/7205* (2013.01)

(58) Field of Classification Search
CPC ............. G06F 12/0253; G06F 12/0269; G06F 2212/7205
See application file for complete search history.

(56) References Cited

U.S. PATENT DOCUMENTS

| | | | | |
|---|---|---|---|---|
| 6,502,111 B1 * | 12/2002 | Dussud | ............... | G06F 12/0269 |
| 6,671,707 B1 * | 12/2003 | Hudson | ............... | G06F 12/0269 |
| 7,404,182 B1 * | 7/2008 | Garthwaite | ......... | G06F 12/0269 717/140 |
| 7,428,560 B1 * | 9/2008 | Detlefs | ............... | G06F 12/0276 |
| 7,685,580 B1 * | 3/2010 | Detlefs | ............... | G06F 12/0253 717/140 |
| 7,953,773 B2 * | 5/2011 | Lindholm | ........... | G06F 12/0269 711/170 |
| 2006/0155791 A1 * | 7/2006 | Tene | .................... | G06F 12/0269 711/E12.012 |
| 2006/0230087 A1 * | 10/2006 | Andreasson | ........ | G06F 12/0269 |
| 2010/0082710 A1 * | 4/2010 | Kilner | .................. | G06F 12/0269 707/813 |
| 2010/0107168 A1 * | 4/2010 | Auerbach | ............. | G06F 9/4887 718/103 |
| 2010/0114997 A1 * | 5/2010 | Micic | .................. | G06F 12/0269 707/813 |

(Continued)

OTHER PUBLICATIONS

Detlefs et al., Garbage-First Garbage Collection, 2004, Association for Computing Machinery, ISMM '04: Proceedings of the 4th international symposium on Memory Management, pp. 37-48. (Year: 2004).*

(Continued)

*Primary Examiner* — Kris E Mackes
(74) *Attorney, Agent, or Firm* — Tutunjian & Bitetto, P.C.; Robert Richard Aragona

(57) ABSTRACT

Garbage collection methods and systems include determining that a condition for performing concurrent marking has been met, based on object write frequency. It is determined that an opportunity for performing concurrent marking has occurred, based on a stop-the-world event. Performance of concurrent marking is delayed until a future stop-the-world event, to prevent pre-write barriers.

20 Claims, 6 Drawing Sheets

(56) References Cited

U.S. PATENT DOCUMENTS

| | | | |
|---|---|---|---|
| 2015/0100752 A1* | 4/2015 | Flood | G06F 12/0269 |
| | | | 711/171 |
| 2018/0217779 A1* | 8/2018 | Stephens | G06F 3/0652 |
| 2020/0409841 A1 | 12/2020 | Nilsen | |
| 2021/0117319 A1 | 4/2021 | Mandaleeka | |

OTHER PUBLICATIONS

Yuasa, Taiichi. "Realtime Garbage Collection on General-purpose Machines(Dissertation_全文)", Thesis or Dissertation, Kurenai Kyoto University Research Information Repository, https://doi.org/10.14989/doctor.r6100. Jan. 23, 1987, pp. 1-46.

Anonymous. "Mostly Stationary Generational Garbage Collection Method for Pauseless High-Performance Managed Run-Time Applications", An IP.com Prior Art Database Technical Disclosure, ip.com. Mar. 10, 2021, pp. 1-13.

* cited by examiner

REDUCING WRITE BARRIERS IN SNAPSHOT-BASED GARBAGE COLLECTION

BACKGROUND

The present invention generally relates to automatic garbage collection, and, more particularly, to snapshot-based garbage collection.

Pre-write barriers may be used for concurrent marking in snapshot-based garbage collection systems. However, the use of pre-write barriers degrades application throughput.

SUMMARY

A computer-implemented garbage collection method includes determining that a condition for performing concurrent marking has been met, based on object write frequency. It is determined that an opportunity for performing concurrent marking has occurred, based on a stop-the-world event. Performance of concurrent marking is delayed until a future stop-the-world event, to prevent pre-write barriers.

A garbage collection system includes a hardware processor and a memory that stores a computer program. When executed by the hardware processor, the computer program causes the hardware processor to determine that a condition for performing concurrent marking has been met, based on object write frequency, to determine that an opportunity for performing concurrent marking has occurred, based on a stop-the-world event, and to delay performance of concurrent marking until a future stop-the-world event, to prevent pre-write barriers.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
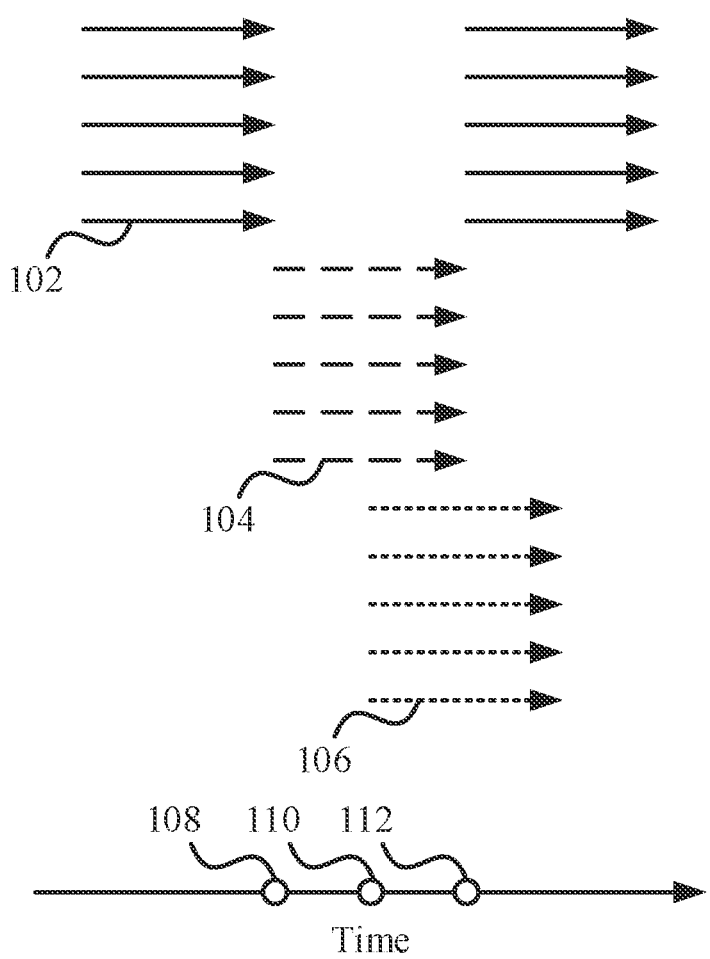
FIG. 1 is a diagram showing an exemplary timeline where garbage collection is performed, including copying garbage collection and concurrent marking garbage collection, the latter of which overlaps in time at least partially with the former, in accordance with an embodiment of the present invention.

To reduce the number of pre-write barriers that are used during automated garbage collection, and so to reduce the performance penalty incurred by such pre-write barriers, the timing of concurrent markings may be delayed. This may be done without decreasing the number of concurrent markings.

The term "automatic garbage collection" in the field of computer science refers to managing memory use by programs in an automated fashion. This contrasts to manual garbage collection, where the programmer identifies when objects in memory are no longer needed and explicitly deallocates them.

A garbage collection thread is a process that identifies and deallocates memory that is no longer needed by a program. Automatic garbage collection can generally do a better job of deallocating unneeded memory objects, whereas manual deallocation by a human programmer is a time-consuming and error-prone practice. Failure to correctly deallocate memory can lead to memory leaks, unnecessary resource usage, and program instability.

However, garbage collection can be resource-intensive for the computer system, as additional computing resources are needed to track and manage the memory usage and deallocation. Thus, in multi-threaded systems, for example systems with multiple processors or processor cores, parallelism in garbage collection provides significant benefits, as garbage collection can be handled more efficiently.

Concurrent marking may be used in garbage collection to identify live objects while application threads are running. Changes to objects may be recorded using a write barrier, which may be run every time a reference in an object is updated. A write barrier flag may be used to force a rescan of part of a garbage collection heap. The use of concurrent marking helps to prevent the need for a full garbage collection being triggered, which occurs when the garbage collection heap is full. At this point, the whole heap is processed with a stop-the-world, which can cause a significant delay in the execution of the program.

An initial phase of the concurrent marking also needs a stop-the-world process, where application threads are suspended. Concurrent marking threads perform garbage collection alongside the running application threads, so that garbage collection may be performed before the heap fills up, reducing the number of full garbage collection events.

Meanwhile, copying garbage collection events are performed periodically. These events also make use of a stop-the-world event. As a result, concurrent marking may be triggered by the same stop-the-world event that is used by the copying garbage collection, so that concurrent marking can be performed alongside copying garbage collection. While this decreases the number of stop-the-world events that are needed by performing multiple tasks with each one, the pre-write barriers that are used by the concurrent marking incur their own performance penalties.

Decreasing the frequency of concurrent marking events can decrease the number of pre-write barriers that are needed, and so decrease the associated performance penalty. However, concurrent marking helps manage the size of the garbage collection heap, which stores memory that is to be deallocated and which has a finite size. Decreasing the number of concurrent marking events can result in larger amounts of information being stored in the garbage collection heap, which can risk filling the heap. As noted above, if the heap is filled, a full garbage collection event is triggered, the performance penalty of which may significantly outweigh any performance benefit obtained by avoiding write barriers.

As a result, concurrent markings may be delayed, with the decision of whether to delay a given concurrent marking being based on an awareness of how frequently the copying garbage collection event is performed. If there are short periods between successive copying garbage collection events, then concurrent marking may be delayed without risking a full garbage collection event. On the other hand, if copying garbage collection is performed infrequently, then the concurrent marking may be performed without delay, to avoid the risk of the full garbage collection event.

The present embodiments are described with particular attention to the garbage collection systems that are implemented in the JAVA® programming language, for example using particular JAVA® virtual machines to implement the garbage collection processes described herein. However, it should be understood that the present principles are not limited to JAVA®, but may be implemented in any computer programming language that uses an appropriate automatic garbage collection system.

Referring now to FIG. 1, a timeline diagram shows threads 102 of an application during execution. The application threads 102 continue to execute until a copying garbage collection event occurs, at which point a stop-the-world event 108 begins and the copying garbage collection threads 104 begin to execute. The application threads 102 are paused while the copying garbage collection threads 104 execute, and resume once they are complete. A set of concurrent marking threads 106 also begin at point 110, after the stop-the-world event 108, and may run concurrently with the copying garbage collection threads 104 until the copying garbage collection threads finish at point 112. Notably, the application threads 102 may resume before the concurrent marking threads 106 have completed.

The concurrent marking threads 106 need a stop-the-world event to begin executing, but do not need the stop-the-world event to continue after a point. Thus, after the copying garbage collection threads end at point 112, the application threads 102 may resume execution, while the concurrent marking threads 106 continue to run. During the execution of the concurrent marking threads, pre-write barriers may be used for particular memory objects, and objects from the garbage collection heap may be processed, their resources being freed to reduce the size of the garbage collection heap.

While this approach avoids the performance of unneeded stop-the-world events, by performing concurrent marking in tandem with copying garbage collection, timing the concurrent marking to be performed with every copying garbage collection may cause other types of delay as a result of the frequent use of pre-write barriers. A pre-write barrier adds operations to application code when concurrent marking garbage collection is being used. They become effective when concurrent marking is running. At other time, the application code skips the operations of the pre-write barrier.

Pre-write barriers provide a connection bridge between an application and the concurrent marking garbage collection to share information as the object graph changes. Because the application can change the object graphs, concurrent marking garbage collection needs to be provided information regarding these changes. For example, an object graph that includes an object A, which refers to an object B, can be changed to having object A refer to object C. The change is then provided to the concurrent marking garbage collection. If this information were not provided, then the garbage collection would still think that objects A and B are live, and would not know that object C is now being used. In this example, object B would become "garbage" to be deallocated. Failing to properly deallocate memory can lead to application instability.

Figure 2:
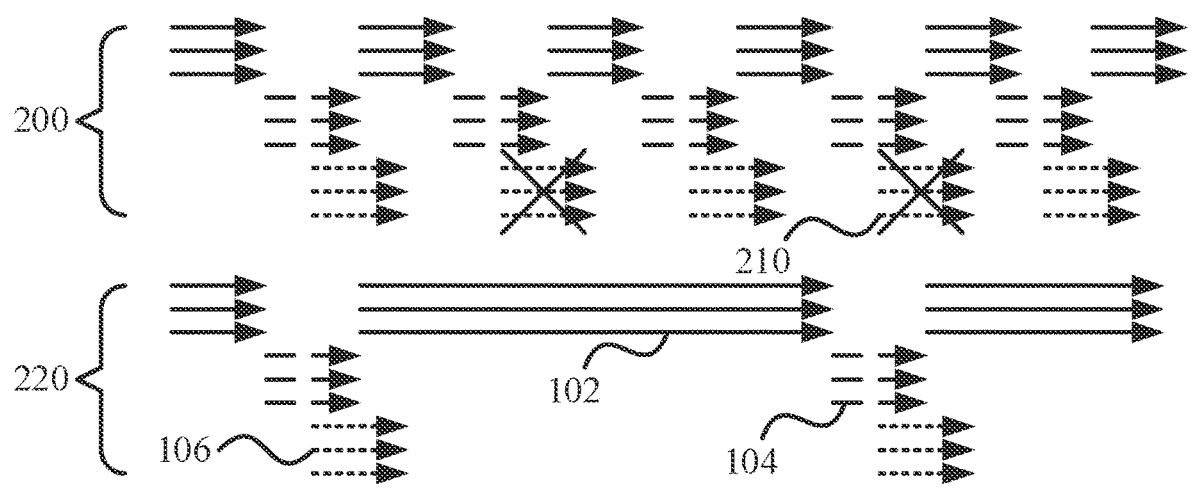
FIG. 2 is a diagram showing an exemplary timeline where garbage collection is performed, and where concurrent marking garbage collection may be selectively delayed to improve performance, in accordance with an embodiment of the present invention.

Referring now to FIG. 2, a timeline diagram shows a comparison of different scenarios. In a first scenario 200, the copying garbage collection threads 104 are called relatively frequently, while in a second scenario 220, the copying garbage collection threads 104 are called relatively rarely. The comparison between the two scenarios illustrates how the period between copying garbage collection events can affect the frequency at which concurrent marking needs to be performed.

In the first scenario 200, because of the relatively high frequency of the copying garbage collection, certain concurrent marking portions 210 may be canceled or delayed. When the concurrent marking portions 210 are delayed, any corresponding pre-write barriers are put off until the next concurrent marking can be performed. This decreases the performance penalty from the pre-write barriers that would otherwise be used during the delayed concurrent marking. Because the next opportunity to perform concurrent marking will come relatively shortly, due to the relatively high frequency of copying garbage collection, the garbage collection heap should not be filled before the concurrent marking has another opportunity to run.

In the second scenario 220, where copying garbage collection is performed relatively infrequently, the garbage collection heap may grow in size between concurrent marking periods. As a result, there is a higher risk of triggering a full garbage collection in such scenarios, particularly if concurrent marking were delayed. Thus, the concurrent marking threads 106 may not be delayed in the second scenario 220, or may be delayed less often than in the first scenario 200, to minimize the risk of full garbage collection.

Figure 3:
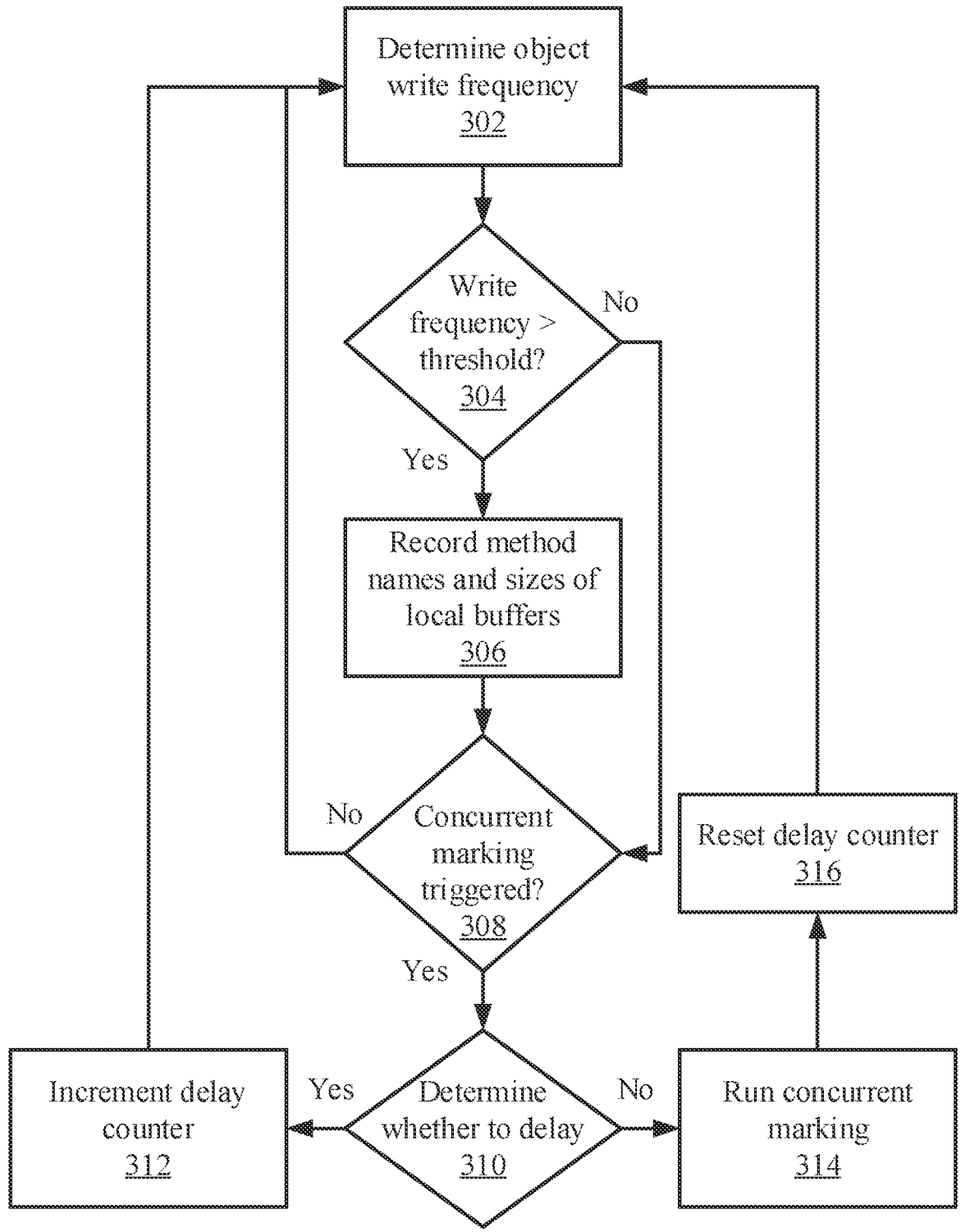
FIG. 3 is a block/flow diagram of a method for determining whether to delay performance of concurrent marking garage collection, after concurrent marking has been triggered, in accordance with an embodiment of the present invention.

Referring now to FIG. 3, a method for improving garbage collection performance is shown. Block 302 determines a frequency of objects' writes by periodically checking the sizes of thread local buffers in the application during runtime. Block 304 compares the determined write frequency to a write frequency threshold. The value of this write frequency threshold may be determined empirically, based on observations of runtime performance, or may be determined by a user or programmer. When the write frequency is above the threshold, block 306 records method names and the sizes of the thread local buffers. A given application development kit may equip thread local buffers to store overwritten objects. Buffer data may be periodically provided to the garbage collection system, which can mark objects as being reachable from objects stored in the buffer.

Block 308 determines whether concurrent marking has been triggered. For example, this may occur when a stop-the-world event occurs for some other reason, such as during copying garbage collection. If concurrent marking has not been triggered, processing returns to block 302 with no action being taken, and write frequencies may be further updated before block 308 checks for concurrent marking again.

When block 308 determines that concurrent marking has been triggered, block 310 determines whether to delay the concurrent marking until a next opportunity occurs. If so, block 312 increments a delay counter (e.g., which has been initialized to zero when the application begins running) and processing returns to block 302, and processing continues until block 308 next determines that concurrent marking has been triggered. An exemplary method for determining whether to delay the concurrent marking is descried in greater detail below. If block 310 determines that concurrent marking should be performed, block 314 runs the concurrent marking and block 316 resets the delay counter to zero. Processing then returns to the loop at block 302, until block 308 next determines that concurrent marking has been triggered. In this manner, concurrent marking may be selectively delayed to improve overall application performance.

Figure 4:
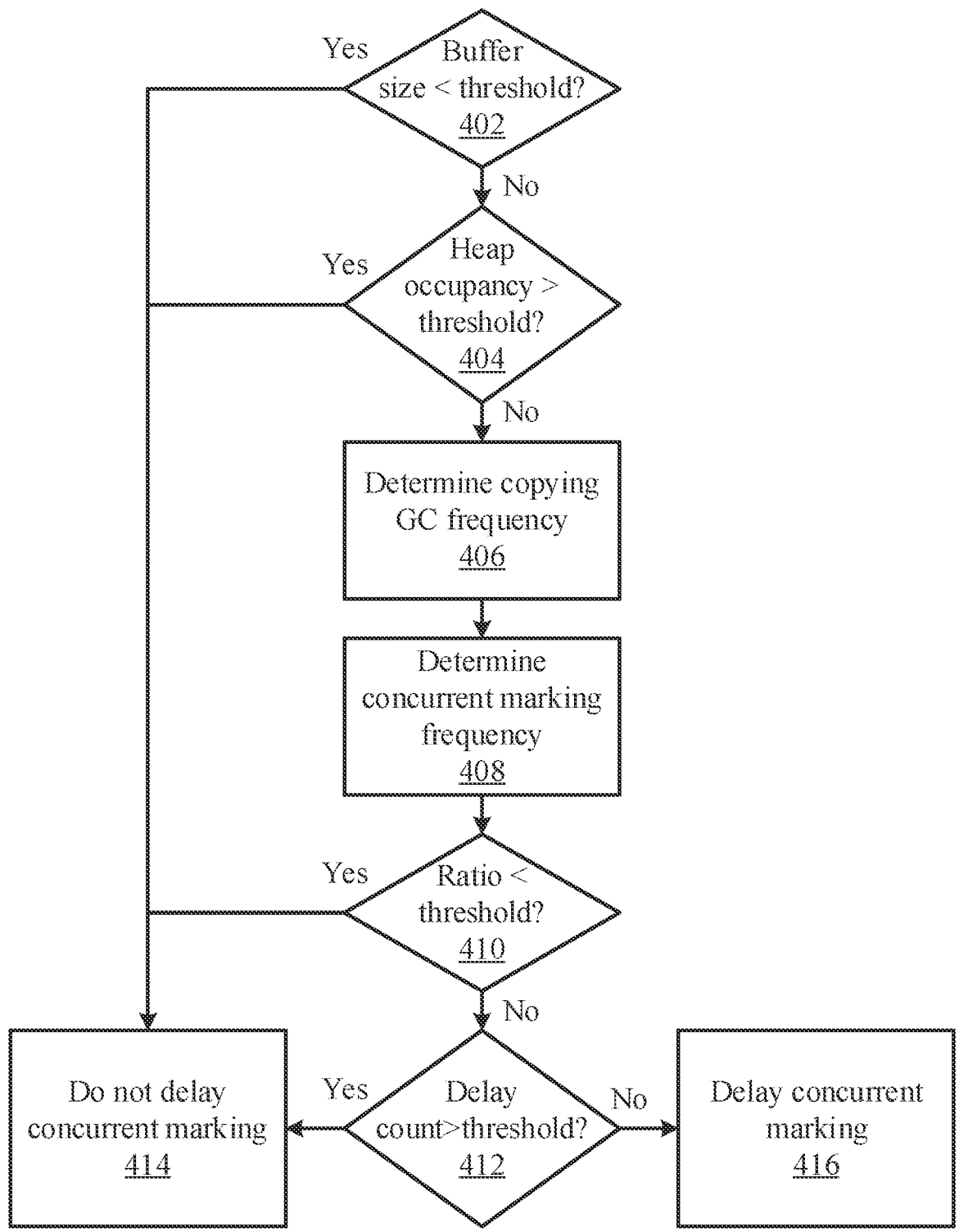
FIG. 4 is a block/flow diagram of a method for evaluating a series of conditions to determine whether to delay performance of concurrent marking garbage collection, in accordance with an embodiment of the present invention.

Referring now to FIG. 4, additional detail on the determination of whether to delay concurrent marking, for example in block 310 above. A series of conditions may be checked to determine whether the concurrent marking may be delayed. If any one of the conditions indicates that the concurrent marking should not be delayed, then concurrent marking may be performed right away.

Block 402 estimates how many objects' writes would occur by checking the previously obtained buffer size that can be obtained by a set of keys (e.g., currently executing methods). If the total of the buffer sizes is below a buffer size threshold, then block 402 leads to the determination that concurrent marking is not delayed at block 414, such that concurrent marking is performed in block 314 as described above.

If block 402 determines that the size is above the threshold, then block 404 determines the present garbage collection heap occupancy and compares it to a garbage collection heap occupancy threshold. If the present garbage collection heap occupancy is greater than the garbage collection heap occupancy threshold, then block 404 leads to the determination that concurrent marking is not delayed at block 414.

If block 404 determines that the garbage collection heap occupancy is greater than the garbage collection heap occupancy threshold, then block 406 determines a frequency M for copying garbage collection events and block 408 determines a frequency N of concurrent marking events. If the ratio between these values, M/N, is large, it is less likely that a full garbage collection event will be triggered, because the number of opportunities to perform concurrent marking is large relative to the number of concurrent markings that are needed to manage the garbage collection heap. On the other hand, if M/N is low, then a full garbage collection event is more likely to be needed if the concurrent marking is delayed. If block 410 determines that the ratio M/N is below a ratio threshold, then concurrent marking is not delayed at block 414.

Block 412 compares the number of times that the concurrent marking has been delayed, for example using a delay count as set by blocks 312 and 316, to a delay count threshold. If the number of delays exceeds the delay count threshold, then concurrent marking is not delayed at block 414. Thus, the conditions described above provide different exceptions, whereby concurrent marking is performed without delay. If none of the exceptions pertains, then block 416 determines that the concurrent marking may be delayed, at which time the delay counter may be incremented in block 312.

The conditions described with respect to FIG. 4 may be checked in any order. Thus, if any of the conditions is found to be satisfied, such that the concurrent marking is not delayed, the other conditions need not be checked. A variety of thresholds are described above for the various conditions. These thresholds may be set to any appropriate values, for example being predetermined or being settable as a virtual machine argument.

Figure 5:
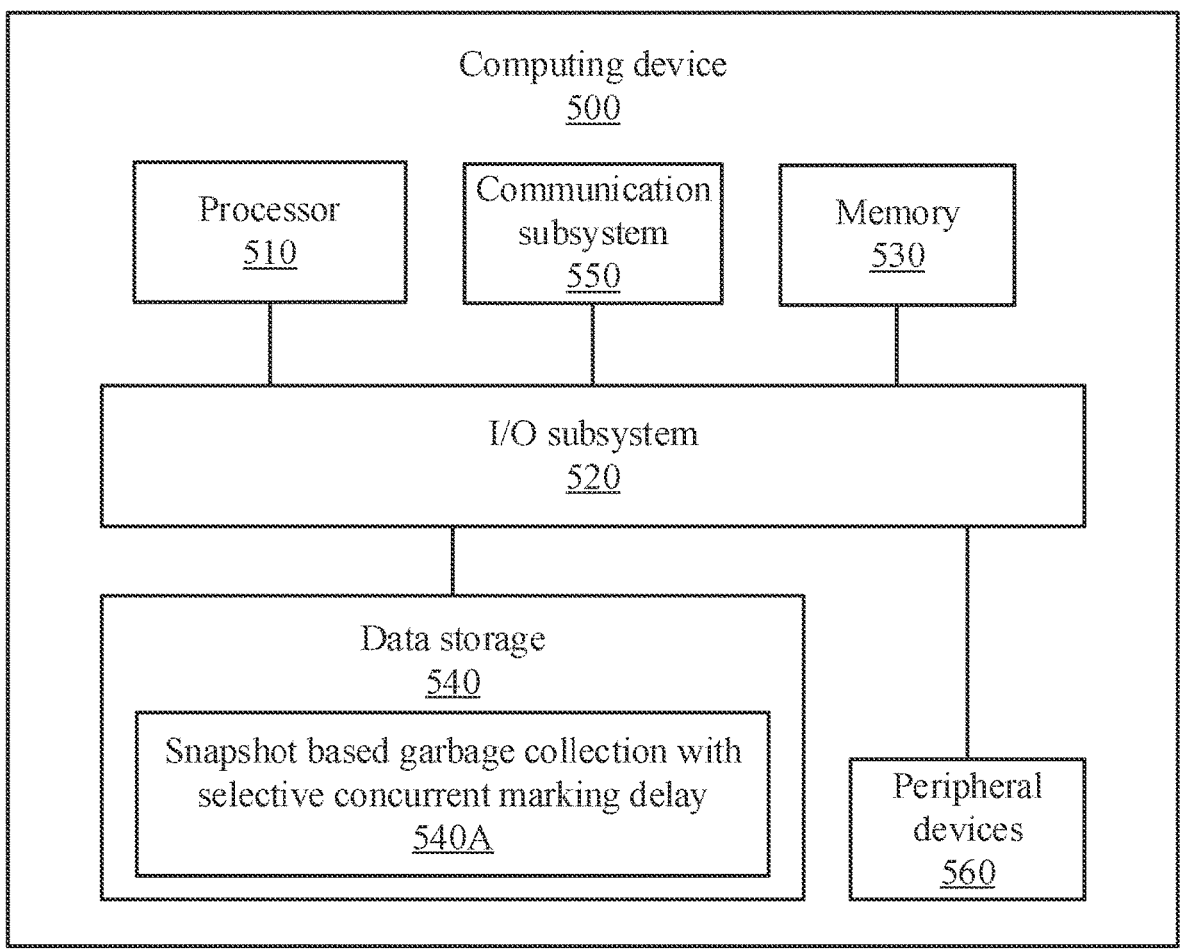
FIG. 5 is a block diagram of a computing device that includes computer program code to perform snapshot based garbage collection with selective concurrent marking delay, in accordance with an embodiment of the present invention.

FIG. 5 is a block diagram showing an exemplary computing device 500, in accordance with an embodiment of the present invention. The computing device 500 is configured to execute tasks using threaded garbage collection.

The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as a one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for snapshot based garbage collection with selective concurrent marking delays. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

Figure 6:
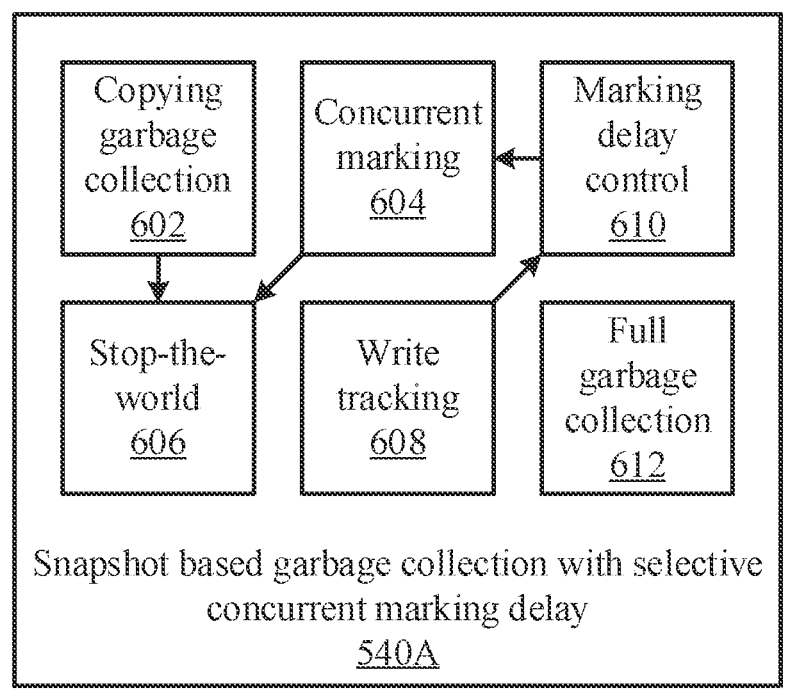
FIG. 6 is a block diagram of a computer program product that performs snapshot based garbage collection with selective concurrent marking delay, in accordance with an embodiment of the present invention.

Referring now to FIG. 6, additional detail on the snapshot based garbage collection with selective concurrent marking delay 540A is shown. Copying garbage collection 602 and concurrent marking 604 are shown as triggering stop-the-world events 606. By running concurrent marking 604 alongside copying garbage collection 602, the number of stop-the-world events is reduced. Additionally, marking delay control 610 determines whether concurrent marking 604 should be delayed, for example on the basis of information generated by write tracking 608 and the conditions described above. Full garbage collection 612 is performed whenever the garbage collection heap is full.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of reducing write barriers in snapshot-based garbage collection (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented garbage collection method, comprising:
   determining that a condition for performing concurrent marking has been met, based on object write frequency;
   determining that an opportunity for performing concurrent marking has occurred, based on a stop-the-world event; and
   delaying performance of concurrent marking until a future stop-the-world event, to prevent pre-write barriers.

2. The method of claim 1, wherein the condition for performing concurrent marking includes determining that an object write frequency exceeds a write frequency threshold.

3. The method of claim 1, further comprising evaluating a delay condition, wherein delaying performance is performed responsive to the evaluation of the delay condition.

4. The method of claim 3, wherein the delay condition includes a comparison of a sum of local thread buffer sizes to a buffer size threshold.

5. The method of claim 3, wherein the delay condition includes a comparison of a garbage collection heap occupancy value to a garbage collection heap occupancy threshold.

6. The method of claim 3, wherein the delay condition includes a comparison of a threshold to a ratio between copying garbage collection frequency and concurrent marking frequency from runtime tests.

7. The method of claim 3, wherein the delay condition includes comparing a number of prior concurrent marking delays to a maximum concurrent marking delay count threshold.

8. The method of claim 7, further comprising incrementing the number of prior concurrent marking delays after delaying performance.

9. The method of claim 8, further comprising performing concurrent marking after delaying performance and resetting the number of prior concurrent marking delays after performing concurrent marking.

10. The method of claim 9, performing garbage collection on memory based on the concurrent marking.

11. A computer program product for garbage collection, the computer program product comprising a computer readable storage medium having program instructions embodied therewith, the program instructions executable by a hardware processor to cause the hardware processor to:
determine that a condition for performing concurrent marking has been met, based on object write frequency;
determine that an opportunity for performing concurrent marking has occurred, based on a stop-the-world event; and
delay performance of concurrent marking until a future stop-the-world event, to prevent pre-write barriers.

12. The computer program product of claim 11, wherein the condition for performing concurrent marking includes a determination that an object write frequency exceeds a write frequency threshold.

13. The computer program product of claim 11, wherein the program instructions further cause the hardware processor to evaluate a delay condition, wherein performance is delayed responsive to the evaluation of the delay condition.

14. The computer program product of claim 13, wherein the delay condition includes a comparison of a sum of local thread buffer sizes to a buffer size threshold.

15. The computer program product of claim 13, wherein the delay condition includes a comparison of a garbage collection heap occupancy value to a garbage collection heap occupancy threshold.

16. The computer program product of claim 13, wherein the delay condition includes a comparison of a ratio between copying garbage collection frequency and concurrent marking frequency to a threshold from runtime tests.

17. The computer program product of claim 13, wherein the delay condition includes a comparison of a number of prior concurrent marking delays to a maximum concurrent marking delay count threshold.

18. The computer program product of claim 17, wherein the program instructions further cause the hardware processor to increment the number of prior concurrent marking delays after delaying performance.

19. The computer program product of claim 18, wherein the program instructions further cause the hardware processor to perform concurrent marking garbage collection after performance is delayed and to reset the number of prior concurrent marking delays after performing concurrent marking.

20. A garbage collection system, comprising:
a hardware processor; and
a memory that stores a computer program, which, when executed by the hardware processor, causes the hardware processor to:
determine that a condition for performing concurrent marking has been met, based on object write frequency;
determine that an opportunity for performing concurrent marking has occurred, based on a stop-the-world event; and
delay performance of concurrent marking until a future stop-the-world event, to prevent pre-write barriers.

* * * * *